June 9, 1942.   J. M. TOWLER ET AL   2,286,026
HYDRAULIC VALVE
Filed Aug. 1, 1940   3 Sheets-Sheet 1

Inventor
John Maurice Towler
Frank Hathorn Towler
by
Attorney

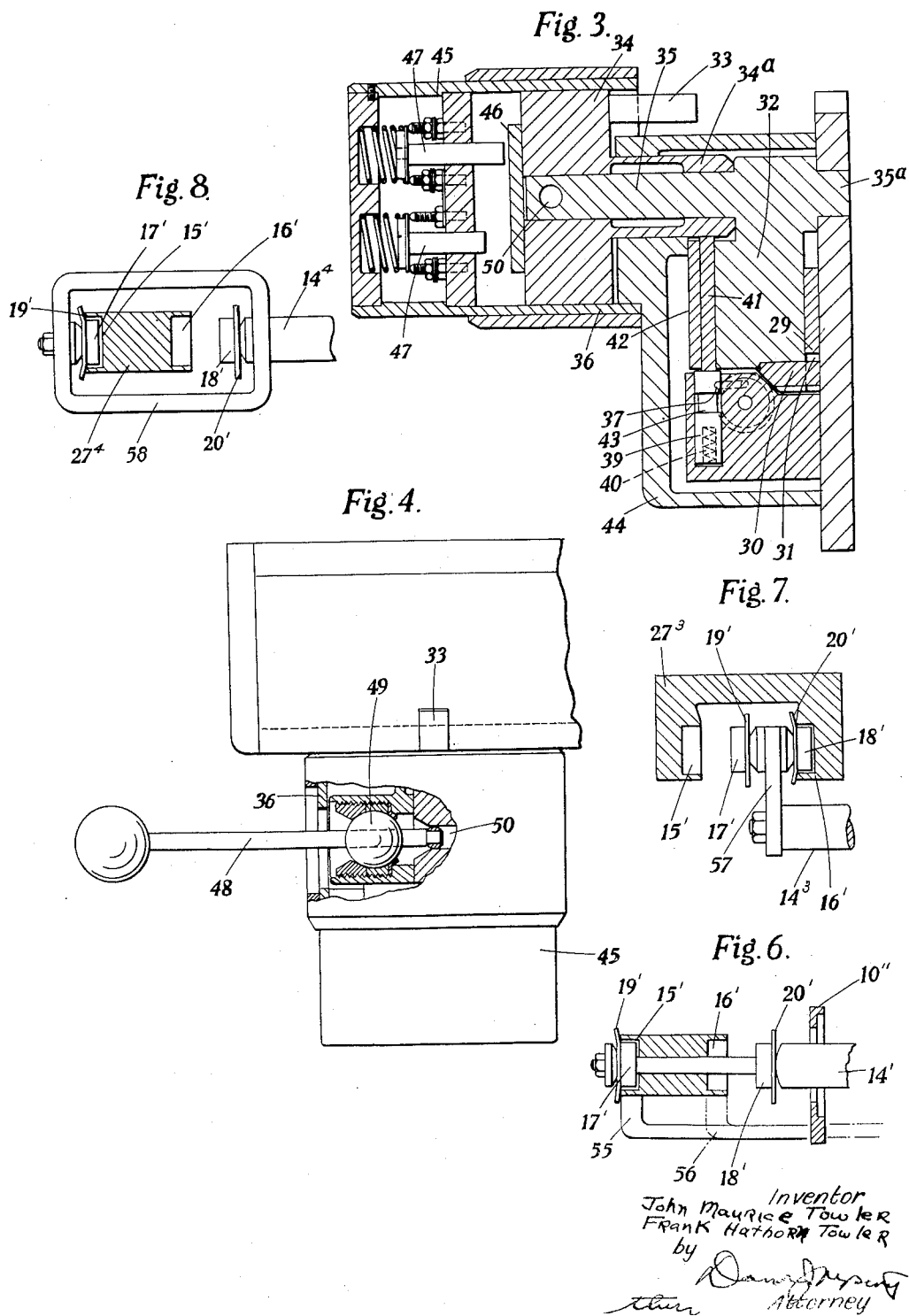

Patented June 9, 1942

2,286,026

UNITED STATES PATENT OFFICE 2,286,026

HYDRAULIC VALVE

John Maurice Towler and Frank Hathorn Towler, Yorkshire, England

Application August 1, 1940, Serial No. 349,102
In Great Britain June 8, 1939

13 Claims. (Cl. 121—164)

This invention relates to hydraulic valves for reversing hydraulic machinery such for example as for controlling the hydraulic traverse of machine tools of the kind in which either the work or the tool is automatically reciprocated by a hydraulic piston and cylinder or a hydraulic rotary motor such, for example, as honing machines, grinding machines, shaping machines, planing machines, hydraulic lifts and hydraulically operated reciprocating conveyors.

The principal object of the present invention is to provide a valve of the above kind, preferably tappet operated, to reverse the machine at each end of its traverse, which valve embodies a hydraulic detent to hold the valve at each extremity of its movement and which will permit the valve satisfactorily to control the operation of the hydraulic piston or motor at variable or fixed speeds up to three hundred or more reciprocations per minute.

A further object of the invention is to provide such a valve as above with means, operable by the operator, whereby the hydraulic detents may be put out of action in such manner that the valve may be operated by hand to start and stop the machine at any position of the stroke, or put the tappet or other automatic gear out of action so that the operator may control the movement of the hydraulic piston or motor by hand whereby the machine can be made to traverse past the tappets if desired.

The present invention broadly consists of a hydraulic reversing valve said valve comprising suction means which in normal operation of the valve hold the valve at each extremity of its movement and which offer a yieldable resistance to release and means operated by the hydraulic piston or other reciprocating member, the movement of which is to be controlled, and serving to overcome or release the hold of each suction means in turn and permit the valve to open each end of the one or more hydraulic cylinders to pressure liquid in alternation.

In a valve according to the present invention it is preferred that the moving member of the valve, which is preferably of the piston type, shall have a fly-over action so that each reversal of the valve member shall take place with great rapidity. This may be effected by applying endwise pressure to the valve member through a spring which under the resistance afforded by the suction means is thereby compressed after which the pressure is positively applied to the valve member to cause the suction hold on the valve member to break. The loaded spring then shoots the valve member to the opposite extremity of movement where it is held by the other suction means until again released by the endwise pressure. The endwise pressure is preferably applied through a tappet gear operated by the hydraulic piston or other reciprocating part of the mechanism the movement of which is to be controlled. The stroke of the reciprocating member and the number of reversals per unit of time may be varied by predeterminedly adjusting the tappet gear.

Alternatively the suction hold may be broken either by distorting a flexible diaphragm forming part of each suction means or by valve means to restore a balance of pressure on both sides of each said suction means.

The suction means for a valve according to the present invention may comprise two recesses each adapted normally to be immersed in a body of liquid and situated in relation to each other so as to correspond to the limits of the reciprocating movement of the valve member, two displacement bodies movable with the valve member into and out of each recess in alternation and a flexible or other suitable diaphragm associated with each displacement body so as to close the open side of each recess, when its associated displacement body has entered said recess, and be held firmly there against by the suction resulting from the displacement of liquid from the recess by the entry of the displacement body.

Alternatively the diaphragm may be dispensed with, the displacement bodies themselves being adapted to provide the desired suction hold, the breaking thereof being effected by opening the interior of each recess in turn to effect a restoration in the pressure balance on each side of the displacement body.

The suction means may conveniently be rendered inoperative by allowing the displaced liquid from each recess to return past a manually operable valve. The liquid may be allowed to return either from the opposite recess by way of a connecting pipe controlled by a single valve or directly from the immersing liquid through separate valves.

In a valve according to one embodiment of the present invention the operation to render inoperative the suction means also renders inoperative the tappet gear and breaks the current supply to a motor-driven hydraulic pump, thus stopping the supply of pressure liquid.

In order that the invention may be clearly understood and carried into effect several embodiments will now be described by way of example, by aid of the accompanying drawings in which:

Fig. 3 is a transverse section taken on the line 3—3 of Fig. 2.

Fig. 4 is a top plan view, partly in section, of the left hand portion of the apparatus illustrated in Fig. 2 showing the lever for manually operating the hydraulic valve.

Figs. 6, 7 and 8 are diagrams illustrating further modifications in the suction means.

Figure 1:
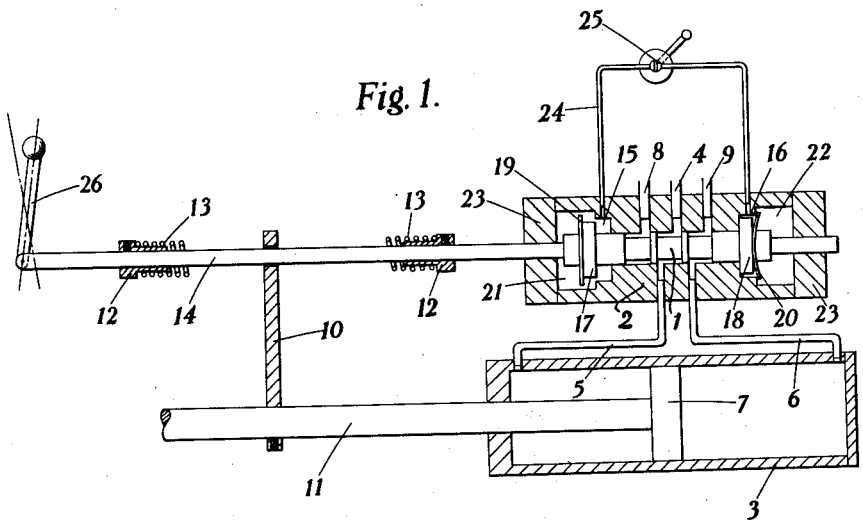
Fig. 1 is a diagrammatic view illustrating a valve according to one embodiment in which the suction means are arranged at opposite ends of the piston valve and showing the same operatively associated with a hydraulic piston and cylinder.

In the example illustrated in Fig. 1 the control valve is of the packingless piston type, and comprises a valve member 1 reciprocable within a bore in a valve body 2 and serving to control the delivery of pressure liquid from a hydraulic pump or other source of supply to opposite ends of a hydraulic cylinder 3. The pressure liquid enters the valve casing through the inlet 4 and is directed by the piston of the valve to the opposite ends of the hydraulic cylinder in alternation through the connections 5 and 6. When pressure liquid is thus being supplied to one end of the hydraulic cylinder the liquid in the opposite end of the cylinder is expelled by the movement of the hydraulic piston 7 through the adjoining supply inlet and so out through one or other of the exhaust outlets 8 or 9. For example if pressure liquid is entering the left hand end of the hydraulic cylinder through the connection 5 the piston 7 will move to the right and expel the liquid within the right hand end of the cylinder through the connection 6 and so to exhaust through the outlet 9.

In the example illustrated the valve piston is reciprocated by a striker 10 carried by the hydraulic piston rod 11 through the medium of tappets 12 and interposed springs 13 both of which are adjustably mounted on a tappet rod 14 forming an extension of the valve piston. The tappets are positioned on the tappet rod in predetermined spaced relationship on opposite sides of the striker 10, the spacing of the tappets corresponding to the stroke of the hydraulic piston required to impart the desired traverse to the work or tool of the machine with which the valve is associated.

The object of the springs 13 is to impart a fly-over action of the valve piston from one extremity of its movement to the other. This object is attained by providing means for restraining the valve piston against freedom of movement when at each extremity of movement so that the striker 10 in overcoming such restraining influence fully compresses the spring which is contacted. Therefore when the restraining influence is overcome, which occurs after the spring has been compressed, the energy in the loaded spring serves to fling the valve piston suddenly to its opposite extreme position where it is again held, when the releasing operation is repeated, and so on each time the motion of the hydraulic piston has to be reversed.

For the purpose of thus holding the valve piston in each change-over position the present invention requires the use of suction means which offer a yieldable resistance to release.

In the example illustrated in Fig. 1 these suction means comprise two recesses 15 and 16 each adapted normally to be immersed in a body of liquid and situated in relation to each other so as to correspond to the limits of movement of the valve piston, two displacement bodies 17 and 18 movable with the valve piston into and out of each recess in alternation and a rubber or other suitable flexible diaphragm 19 and 20 abutting against the outside face of each displacement body so as to close the open side of each recess when its associated displacement body has entered the recess and be held firmly there against by the suction resulting from the displacement of liquid from the recess. In the embodiments of Figs. 2, 6, 7 and 8, the suction means comprise recesses 15' and 16', the displacement bodies 17' and 18' and the flexible diaphragms 19' and 20', and the association of such elements with the remainder of the structure will be perceived in the specific description of such embodiments.

In the example illustrated in Fig. 1 the recesses 15 and 16 are formed at opposite ends of the bore in which the valve piston reciprocates, whilst the displacement bodies with their accompanying flexible diaphragms are mounted in suitable relationship upon opposite ends of the spindle of the valve piston. The liquid for immersing the recesses 15 and 16 is contained within capacity chambers 21 and 22 which are kept filled with said liquid and these chambers are sealed by end covers 23.

In the drawings the valve piston is shown held in the extreme left-hand position by the suction grip of the right-hand diaphragm 20 which is flexed inwards by the differential pressures existing within and without the recess 16. The pressure required to overcome this suction hold is sufficient to produce first the compression of the spring which is supported by the tappet on the right hand side of the striker 10 and then the breaking of the suction hold. As soon as the suction is broken by the end pressure thus positively applied by the striker, the valve piston is freed, so permitting the compressed spring to exert influence enough to fling the valve piston with great rapidity across to the opposite position, where it is similarly held by the resulting suction grip of the opposite diaphragm 19, which, in the figure, is shown in the relaxed or disengaged position.

From the above description it will be understood that the stroke of the valve piston is always the same whilst the stroke of the hydraulic piston is variable and determined by the spacing of the tappets 12. It will also be gathered that the valve piston must always complete its change-over before reversal of the hydraulic piston can occur. It is for this reason that it is preferred that the valve piston should have a fly-over action so that the speed of its motion at each change-over shall always exceed the speed of motion of the hydraulic piston.

In certain circumstances it is desirable that the valve shall be operable by hand such as when the part to be traversed has to be inched into position or for other reasons. For this purpose means are provided for rendering the suction means inoperative. This is effected in all the examples illustrated by providing means in connection with each recess 15 and 16 so that the liquid may escape in advance of each entering displacement body and pressure be maintained equalised on both sides of the flexible or other diaphragm.

In the example illustrated in Fig. 1 the above means take the form of a pipe 24, forming a connecting bridge between the interior of both recesses, and an interposed hand operated valve 25 which, when opened, permits liquid displaced from one recess to pass along the connecting pipe into the opposite and open recess. The two recesses are thus open to each other and in consequence the valve piston is freed from any restraining influence and may be moved freely in either direction by hand, for example, by the hand lever 26.

Figure 2:
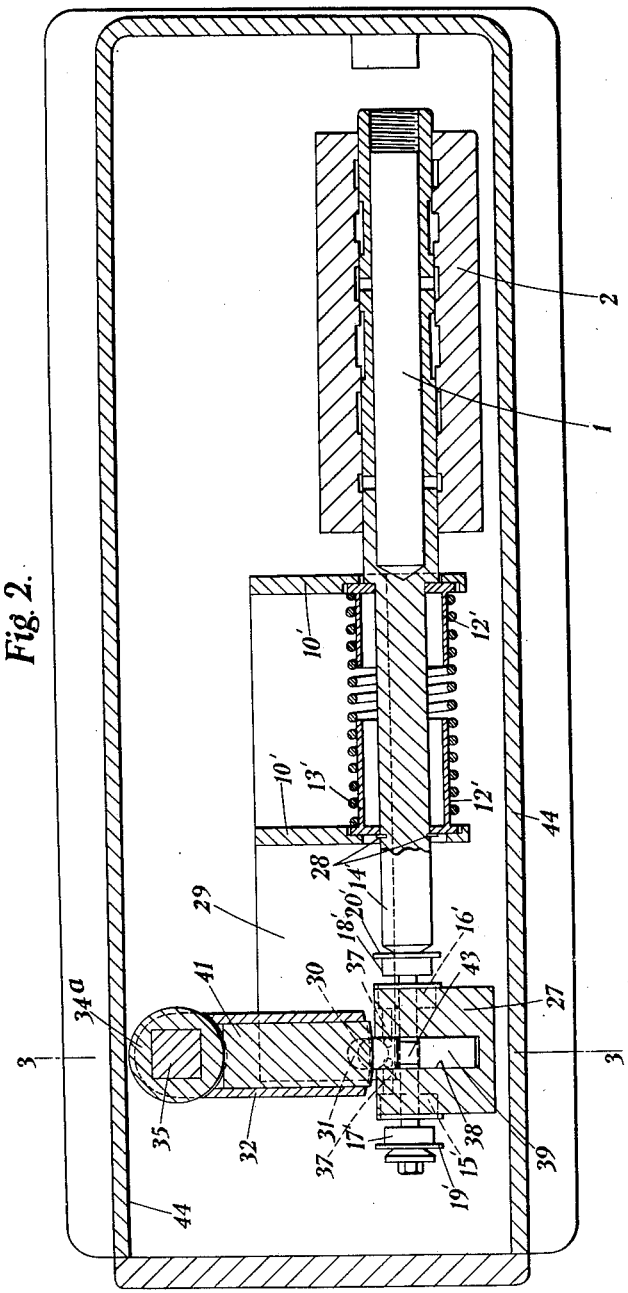
Fig. 2 is a longitudinal section through a valve according to a further embodiment in which the suction means form a separate unit which is disposed at one end of the piston valve.

The embodiment illustrated in Fig. 2 differs from the example illustrated in Fig. 1 principally in that the suction holding means is separated from the valve casing proper and forms a unit 27 arranged at one end of the valve spindle 14', on an extension of which are formed or mounted the displacement bodies 17' and 18', and the diaphragms 19' and 20'. The recesses, in this case formed in opposite sides of the body of the unit 27, are indicated by the references 15' and 16'.

In this embodiment the tappets 12' are slidably mounted upon the main part of the valve spindle 14' and are held apart against stops 28 on one side and by a shoulder on the other or inner side of the rod, by a single interposed spring 13'. Each tappet is in turn forced inwards against the interposed spring and into abutting engagement with the opposite tappet by a pair of strikers 10' both of which are attached to a reciprocable plate 29. This plate is coupled by a pin and slot connection 30 and 31 respectively to a lever 32 which receives a rhythmic oscillating motion from the hydraulic piston or other reciprocating member, the motion of which is to be controlled, by a tappet carried thereby, which strikes a pin 33, see Fig. 3, as the tappet moves back and forth with the motion of said member. The pin 33 projects from a member 34 which is mounted to slide along a squared shaft 35, forming part of the lever 32 and one of the pivots about which the lever oscillates, and within a sleeve 36 forming a bearing for said member 34. The other and opposite part of the pivot is indicated at 35a.

The means, in the present example, for rendering the suction devices inoperative comprise inlets 37 leading from the inner end of each recess 15', 16', to a bore in the middle of the block forming the body of the unit 27, which inlets are opened and closed by the vertical movement of a sliding plug piece 39 which fits within the bore 38. The plug piece is normally held in the depressed position shown against a spring 40, see Fig. 3, by a slide 41 which fits within a recess cut in one face of the lever 32 and is held in place within said recess by a cover plate 42. The underface of the slide 41 is curved as shown, so that contact is maintained with the upper face of the plug piece as the lever 32 oscillates about its pivots.

When in the depressed position shown the plug piece closes the inner ends of the inlets 37, but when the plug piece is allowed to rise, under the influence of its spring, a reduced portion 43 is brought into registration with said inlets, thus opening the same and placing the interior of each recess in communication with the interior of the main casing 44 containing the valve body and the suction unit, which casing is maintained filled with oil. The suction devices are thereby rendered inoperative.

The above release of the plug piece 39 is brought about by sliding the member 34 outwards along the squared shaft 35 and thereby removing a bush 34a, forming an extension of the member 34, from the position shown in Fig. 3, where such bush resides above and in contact with the upper end of the slide 41, to a position where it is clear of the upper end of the plug piece.

The slide and the plug piece 39, which are normally held depressed by the bush 34a, are thus released and are permitted to rise under the influence of the spring 40 and so open the inlets 37.

When the member 34 is moved outwards to cause the suction devices to become inoperative, the pin 33 will also be moved out of the path of the tappet gear thus disconnecting the lever 32 from the automatic operating means and permitting the same to be turned by hand. The endwise movement of the member 34 may also be utilised to stop the supply of pressure liquid to the hydraulic cylinder of the hydraulic traverse. This is conveniently effected by utilising a motor driven hydraulic pump to supply the pressure liquid and arranging a suitable make and break switch 45 in advance of the member so that a plate 46 mounted on the outside face of the member will contact with and depress in turn spring plungers 47 of the make and brake switch and thus cut off the electric current from the pump motor in known manner. The means for manually operating the member 34 to effect the above results is illustrated in Fig. 4 and comprises a hand lever 48, which is supported intermediate its length by a ball joint 49 and engages by its inner end a recess 50 in the squared shaft 35. By this means the lever is capable both of an oscillating movement to impart a corresponding oscillating movement to the lever 32, and consequently reciprocatory movement of the valve piston 1, and also a side to side movement to slide the member 34 along the squared shaft 35.

If desired the diaphragms 19' and 20' in the suction means may be dispensed with, the displacement bodies themselves being relied upon to produce the desired suction hold.

Figure 5:
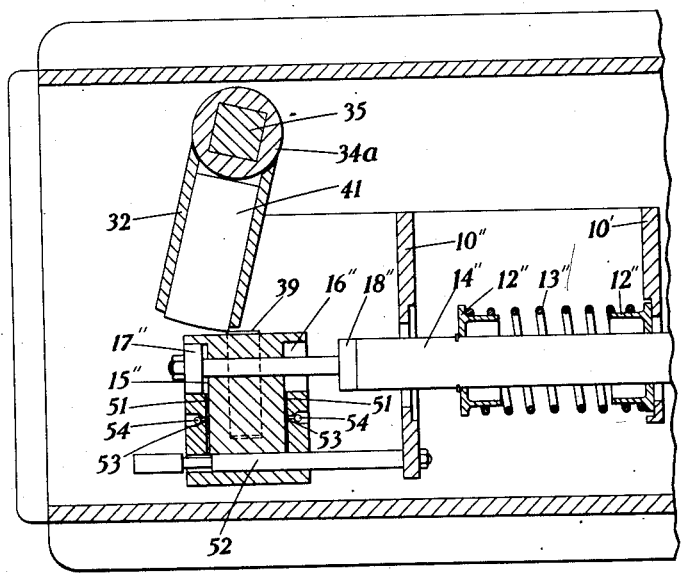
Fig. 5 is a view in longitudinal section showing a modified form of the suction means illustrated in Fig. 2.

This modification is illustrated in Fig. 5 and involves making the displacement bodies 17" and 18" a fairly close sliding fit in their recesses 15" and 16", and effecting release by opening the space in each recess behind each body to the surrounding liquid. Such release may conveniently be effected by the means shown in the figure, which comprise passages 51 leading from the inner end of each recess and a reciprocating valve member 52 of the piston type adapted to open and close the outer end of each passage in alternation. This valve member is attached to, and receives its reciprocating motion from one of the strikers 10" which is extended for the purpose.

The escape of liquid from each recess in advance of each displacement body as it enters is allowed by providing an outlet 53 from each passage, and a non-return valve 54 serving to close said outlets against ingress of liquid from the outside.

A further method of breaking the hold of each suction device in lieu of the axially applied end pressure utilised in the arrangements illustrated in Figs. 1 and 2 is to apply pressure to the overlapping edge of each flexible diaphragm so as to distort the same out of contact with the edge of its recess. One means for this purpose is illustrated in Fig. 6 and comprises a finger 55 projecting at right angles to the outer end of a rod 56 the inner end of which is carried by and reciprocates with one of the strikers 10''.

In the arrangements illustrated in Figs. 2 to 6 the rod carrying the displacement bodies and, when used, the flexible diaphragms, is shown as sliding within a hole extending from one recess to the other. With such a construction great care must be exercised in seeing that the fit of the rod within its hole shall be such as to prevent leakage from one recess to the other. As such a fit is difficult both to obtain and maintain such a construction may, with advantage, be dispensed with. Two methods of doing this are illustrated in Figs. 7 and 8.

In the arrangement illustrated in Fig. 7 the block or body $27^3$ containing the recesses is in the form of a U whilst the displacement bodies and flexible or other diaphragms, when the latter are used, are carried by a crank arm 57 which is attached to the outer end of the valve extension spindle $14^3$ and extends to within the gap of the U-shaped body $27^3$, within which it reciprocates.

In the other arrangement illustrated in Fig. 8 the displacement bodies and flexible or other diaphragms, when the latter are used, are carried by a yoke 58 which surrounds the body portion $27^4$. This yoke, like the crank-arm in the preceding arrangement is carried by the outer end of the spindle $14^4$.

Whilst flexible diaphragms of rubber or similar material are very satisfactory in use, it is not essential that the same should be used, as rigid diaphragms may equally well be employed but in such cases there should be a flexible connection between the displacing member and the rigid diaphragm.

What we claim is:

1. A hydraulic reversing valve for opening each end of a hydraulic operating cylinder to pressure liquid, incorporating suction means for holding the valve at each extremity of its movement under a yieldable resistance to release and means operated by a reciprocating member, the movement of which is to be controlled, and serving to overcome or release the hold of each suction means in turn and displace the valve to open each end of the hydraulic operating cylinder to pressure liquid in alternation.

2. In a hydraulic reversing valve the combination with a movable member, releasable suction means for separably holding the movable member at each extremity of its movement, resilient means operatively associated with each suction means, means for periodically acting successively on said resilient means and said movable member, whereby each said resilient means is in turn loaded, and thereafter the hold of its associated suction means on the movable member is terminated, whereby each said resilient means is adapted to unload simultaneously with each release of the movable member to impart a sudden impulse to said movable member to cause said member to change over to its opposite exremity of movement with a rapid or fly-over action.

3. In a hydraulic reversing valve, means for creating a fly-over action to produce rapid reciprocation of a piston-type valve member controlling the delivery of pressure liquid to and its exhaust from each hydraulic cylinder of the hydraulic traverse mechanism of an associated machine to control reciprocation of the operating piston effecting said traverse, said means comprising two recesses each adapted normally to be immersed in a body of liquid and situated in relation to each other so as to correspond to the limits of the reciprocating movement of said valve member, two displacement bodies movable with the valve member into and out of each recess in alternation, and adapted to close the open side of each recess when its associated displacement body has entered said recess and be held firmly by the suction resulting from the displacement of liquid from said recess by the entry of the displacement body and thereby similarly hold the valve member against movement, and means for terminating the suction hold of each displacement body in turn said means being operated by the reciprocating member, the movement of which is to be controlled.

4. A hydraulic valve according to claim 2 wherein each suction means consists of a recess immersed in liquid into and out of which recess a displacement member is moved, and having means for rendering the suction means inoperative, said means comprising a valve which may be operated at the will of the operator to place each recess in open communication with the liquid in which the same is immersed so that when said valve is open a pressure balance exists on both sides of each suction producing means.

5. A hydraulic valve according to claim 1 wherein each suction means comprises a displacement member, a normally immersed recess into and out of which the displacement member is moved with the corresponding movement of the valve member and a diaphragm for closing the open end of the recess following the entry of the displacement member the arrangement being such that the diaphragm is held against the open end of the recess by suction.

6. A hydraulic valve according to claim 1 wherein each suction means consists of a displacement member and a normally immersed recess, said displacement member being a close sliding fit in the recess into and out of which it is moved with the corresponding movement of the valve member, said reciprocating means serving to open the interior of the recess to immersing liquid the arrangement being such that the displacement member is held in position within the recess by suction its release being effected by opening the interior of the recess to the immersing liquid to destroy the suction.

7. A hydraulic valve according to claim 1 having means for operating the said valve by hand and means for rendering the suction means inoperative to permit the valve to be operated by hand.

8. In a reversible valve assembly for controlling the charging of pressure liquid alternately into opposing ports of a hydraulic cylinder, the piston of which is reciprocated between the ports thereof by the pressure liquid, a movable member reciprocable for alternately opening the respective ports to pressure liquid, suction means acting on said movable member for holding the same under yieldable resistance at the end of each directional movement thereof, and means periodically operable to successively terminate the holding action of the suction means and displace the movable member, whereby to progressively open the respective ports to pressure liquid in alternation.

9. In a reversible valve assembly for controlling the charging of pressure liquid alternately into opposing ports of a hydraulic cylinder, the piston of which is reciprocated between the ports thereof by the pressure liquid, a movable member reciprocable for alternately opening the respective ports to pressure liquid, suction means acting on said movable member for holding the same under yieldable resistance at the end of each directional movement thereof, resilient means connected with said movable member, and means periodically operable to successively load the resilient means against the resistance of the suction means, overcome the resistance of said suction means and displace the movable member, said resilient means upon the termination of the hold of the suction means on the movable member serving to impart a rapid displacement of said movable member, whereby to progressively open the respective ports to pressure liquid in alternation.

10. In a device of the class described, a hydraulically operable cylinder having ports at its opposite ends and a piston for controlling traverse of an element, a source of supply of liquid under pressure, a reversing valve between said source of supply and cylinder comprising a reciprocable member serving at the extremity of its movement for alternately opening the respective ports to pressure liquid from the source of supply, and suction means for holding said movable member under a yieldable resistance to release at each extremity of its movement, and means operable by said piston and acting on said movable member for successively terminating the hold of the suction means on said movable member and displacing the movable member to alternately open the respective ports to pressure liquid, thereby to control the direction of movement of said piston.

11. In a device of the class described, a hydraulically operable cylinder having ports at its opposite ends and a piston reciprocable therebetween, said piston serving to effect a traverse of a mechanism for performing work, a source of supply of liquid under pressure for charging the cylinder through its ports against the piston to reciprocate the same, a reversing valve comprising a movable member connected between the source of supply of pressure liquid and the cylinder and serving at the extremity of its movement for alternately opening the respective ports to pressure liquid from the source of supply, suction means for holding the movable member under yieldable resistance to release, at each extremity of its movement, resilient means on said member and means connected between said piston and said movable member and actuable by said piston respectively to load said resilient means against the resistance of the suction means and thereafter overcome the resistance of the suction means, whereby said resilient means is unloaded for imparting a rapid displacement of said movable member from one extremity to its opposite extremity of movement for respectively opening the ports alternately to pressure liquid, thereby to control the direction of movement of the piston.

12. In a hydraulic reversing valve means for creating a fly-over action to produce rapid reciprocation of a piston-type valve member controlling the delivery of pressure liquid to and its exhaust from each hydraulic cylinder of the hydraulic traverse mechanism of an associated machine to control reciprocation of the operating piston effecting said traverse, said means comprising two recesses each adapted normally to be immersed in a body of liquid and situated in relation to each other so as to correspond to the limits of the reciprocating movement of said valve member, two displacement bodies movable with the valve member into and out of each recess in alternation, each said displacement body having associated therewith a diaphragm adapted to close the open side of each recess when its associated displacement body has entered said recess and be held firmly by the suction resulting from the displacement of liquid from said recess by the entry of the displacement body into the recess and thereby similarly hold the valve member against movement, and means for releasing the suction hold of the diaphragm associated with each displacement body in turn, said means being operated by the reciprocating member, the movement of which is to be controlled.

13. A hydraulic valve according to claim 1 wherein each suction means comprises a displacement member, a normally immersed recess into and out of which the displacement member is moved with the coresponding movement of the valve member and a flexible diaphragm for closing the open end of the recess following the entry of the displacement member the arrangement being such that the diaphragm is held against the open end of the recess by suction.

JOHN MAURICE TOWLER.
FRANK HATHORN TOWLER.